(12) United States Patent
Welker et al.

(10) Patent No.: US 10,323,517 B2
(45) Date of Patent: Jun. 18, 2019

(54) MULTIPLE AXIS ROTARY ENGINE

(71) Applicant: Thomas F. Welker, Waterloo (CA)

(72) Inventors: Thomas F. Welker, Waterloo (CA);
Alexander H. Welker, Blair (CA)

(*) Notice: Subject to any disclaimer, the term of this patent is extended or adjusted under 35 U.S.C. 154(b) by 75 days.

(21) Appl. No.: 15/346,308

(22) Filed: Nov. 8, 2016

(65) Prior Publication Data

US 2018/0128106 A1    May 10, 2018

(51) Int. Cl.

| | |
|---|---|
| F01C 9/00 | (2006.01) |
| F01C 21/08 | (2006.01) |
| F01C 21/10 | (2006.01) |
| F01C 19/00 | (2006.01) |
| F02B 17/00 | (2006.01) |
| F02B 53/08 | (2006.01) |
| F02B 53/10 | (2006.01) |
| F02B 53/12 | (2006.01) |
| F02B 53/00 | (2006.01) |
| F01P 1/02 | (2006.01) |

(52) U.S. Cl.
CPC .............. *F01C 21/08* (2013.01); *F01C 9/005* (2013.01); *F01C 19/005* (2013.01); *F02B 17/005* (2013.01); *F02B 53/00* (2013.01); *F02B 53/08* (2013.01); *F02B 53/10* (2013.01); *F02B 53/12* (2013.01); *F01C 21/10* (2013.01); *F01P 1/02* (2013.01); *Y02T 10/17* (2013.01)

(58) Field of Classification Search
CPC ........ F01C 21/08; F01C 21/10; F01C 19/005; F01C 9/005; F02B 17/005; F02B 53/08; F02B 53/10; F02B 53/12; F01P 1/02
USPC ............................... 418/68, 199, 19; 123/241
See application file for complete search history.

(56) References Cited

U.S. PATENT DOCUMENTS

| | | | |
|---|---|---|---|
| 1,773,635 A | 8/1930 | Simmons | |
| 2,043,544 A * | 6/1936 | Kempthorne | ............. F01C 3/06 123/241 |

(Continued)

FOREIGN PATENT DOCUMENTS

| | | | | |
|---|---|---|---|---|
| WO | WO 8101723 A1 * | 6/1981 | ............. | F01C 9/005 |
| WO | WO 8203106 A1 * | 9/1982 | ............. | F01C 9/005 |

(Continued)

OTHER PUBLICATIONS

International Search Report and Written Opinion for PCT/CA2017/051295, dated Jan. 15, 2018.

*Primary Examiner* — J. Todd Newton
(74) *Attorney, Agent, or Firm* — Bereskin & Parr LLP

(57) ABSTRACT

A rotary engine including a housing and housing head enclosing a combustion chamber, a piston including an output shaft and a piston disk within the housing and rotatable on a piston rotation axis, a quadrant within the housing and around the piston and rotatable on a quadrant rotation axis, wherein the quadrant rotation axis is acutely angled to the piston rotation axis, and a post surrounding a segment of the piston disk. The post pivots relative to the piston about a post-piston rotation axis that is normal to the face of the piston disk. The post pivots relative to the quadrant about a post-quadrant pivot axis that is perpendicular to the quadrant rotation axis. The post rotates about the quadrant rotation axis relative to the housing. Combusting fuel injected into the combustion chamber expands and pushes on the piston disk to rotate the output shaft about the piston rotation axis.

18 Claims, 18 Drawing Sheets

(56) References Cited

U.S. PATENT DOCUMENTS

| | | | | |
|---|---|---|---|---|
| 2,069,646 | A * | 2/1937 | Cohen | F01C 9/005 123/241 |
| 2,173,663 | A * | 9/1939 | Raymond | F02B 53/00 123/241 |
| 2,969,777 | A * | 1/1961 | Blazs | F01C 9/005 418/53 |
| 3,075,506 | A * | 1/1963 | Berry | F01C 1/063 123/18 R |
| 3,101,700 | A | 8/1963 | Bowdish | |
| 3,156,220 | A * | 11/1964 | Miller, Jr. | F01C 9/005 123/241 |
| 3,156,221 | A * | 11/1964 | Miller, Jr. | F01C 9/005 123/241 |
| 3,549,286 | A * | 12/1970 | Moriarty | F01C 3/06 123/245 |
| 3,769,944 | A | 11/1973 | Raymond | |
| 3,857,370 | A | 12/1974 | Hemenway | |
| 3,876,348 | A | 4/1975 | Paul, Jr. | |
| 3,897,756 | A | 8/1975 | Upchurch | |
| 3,915,601 | A | 10/1975 | Keplinger et al. | |
| 3,934,559 | A | 1/1976 | Cohen | |
| 3,994,640 | A * | 11/1976 | Cohen | F01C 9/002 418/68 |
| 4,036,566 | A * | 7/1977 | Konopeskas | F01C 3/06 123/241 |
| 4,144,865 | A * | 3/1979 | Konopeskas | F01C 3/06 123/241 |
| 4,318,675 | A * | 3/1982 | Clarke | F01C 9/005 403/260 |
| 4,519,756 | A * | 5/1985 | Fenton | F01C 9/005 418/68 |
| 5,127,810 | A * | 7/1992 | Kolbinger | F01C 3/06 418/161 |
| 5,147,193 | A * | 9/1992 | Larsen | F01C 3/06 123/221 |
| 5,171,142 | A * | 12/1992 | Proglyada | F01C 3/06 418/68 |
| 5,199,864 | A * | 4/1993 | Stecklein | F01C 3/06 418/53 |
| 5,404,849 | A * | 4/1995 | Fenton | F01C 3/06 123/241 |
| 5,993,182 | A * | 11/1999 | Beldy | F01C 9/002 366/279 |
| 6,032,636 | A | 3/2000 | Kajino | |
| 6,241,493 | B1 * | 6/2001 | Turner | F01C 3/06 418/1 |
| 6,325,038 | B1 * | 12/2001 | Millett | F01C 9/005 123/241 |
| 6,776,135 | B1 | 8/2004 | Chen et al. | |
| 6,941,900 | B1 * | 9/2005 | Malinov | F01C 9/005 123/18 R |
| 7,014,605 | B2 * | 3/2006 | Weatherbee | A61M 1/1081 600/16 |
| 7,435,064 | B2 * | 10/2008 | Huttlin | F01C 9/005 418/35 |
| 7,563,086 | B2 * | 7/2009 | Huttlin | F01C 3/02 123/241 |
| 8,152,504 | B2 * | 4/2012 | Didin | F01C 9/005 123/18 R |
| 8,297,239 | B2 | 10/2012 | Kwok | |
| 8,689,766 | B2 * | 4/2014 | Oledzki | F01C 3/085 123/241 |
| 8,985,979 | B2 * | 3/2015 | Didin | F01C 3/06 123/18 R |
| 9,200,515 | B2 | 12/2015 | Ristau | |
| 2010/0224165 | A1 * | 9/2010 | Nagy | F01C 9/005 123/205 |
| 2015/0004037 | A1 * | 1/2015 | Ristau | F01C 9/005 418/1 |
| 2018/0045052 | A1 * | 2/2018 | Fenton | F01C 9/005 |

FOREIGN PATENT DOCUMENTS

| | | | | |
|---|---|---|---|---|
| WO | WO 8400997 A1 * | 3/1984 | | F01C 3/06 |
| WO | 8704495 | 7/1987 | | |
| WO | WO 8803986 A1 * | 6/1988 | | F01C 9/005 |

\* cited by examiner

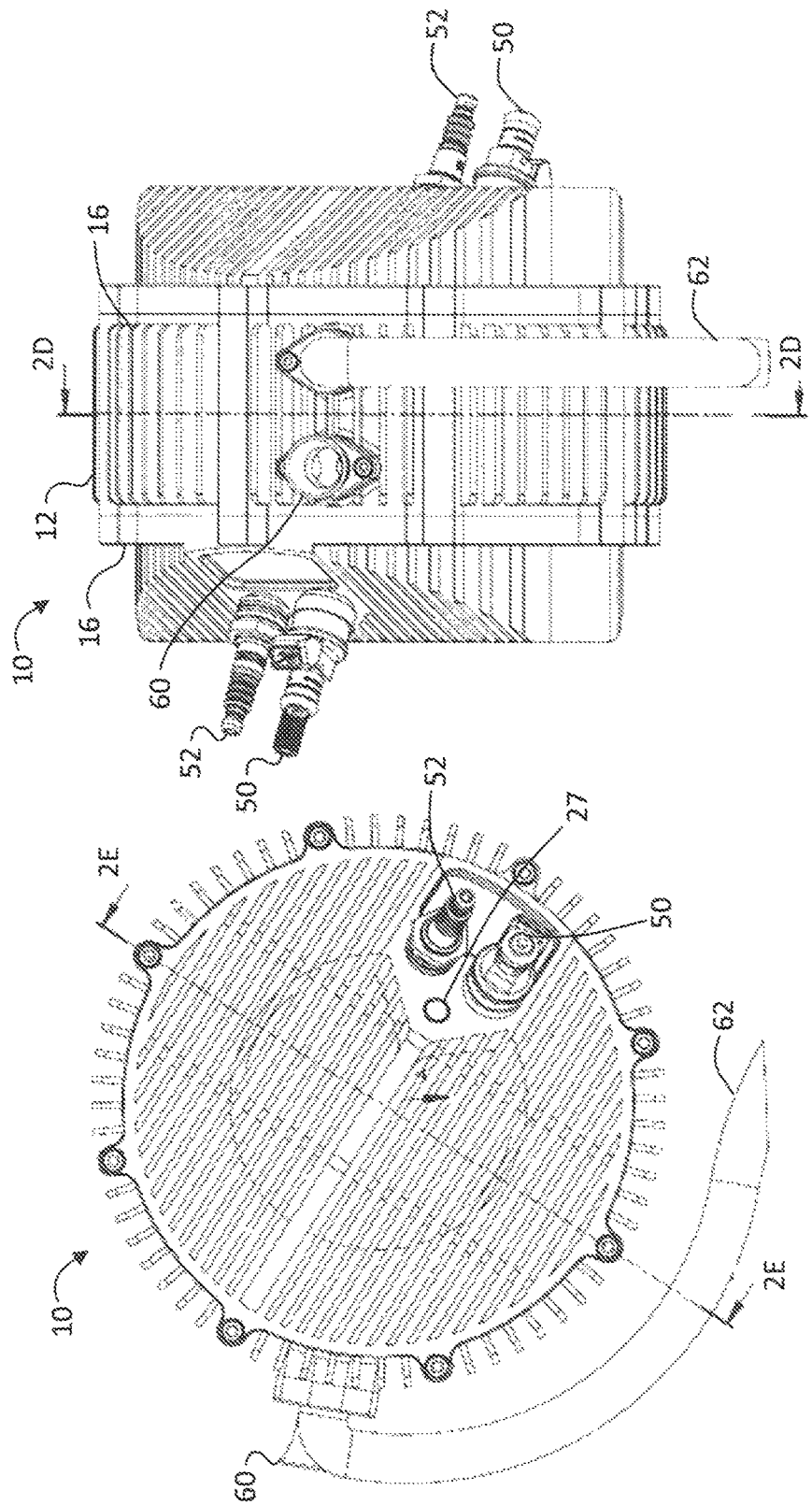

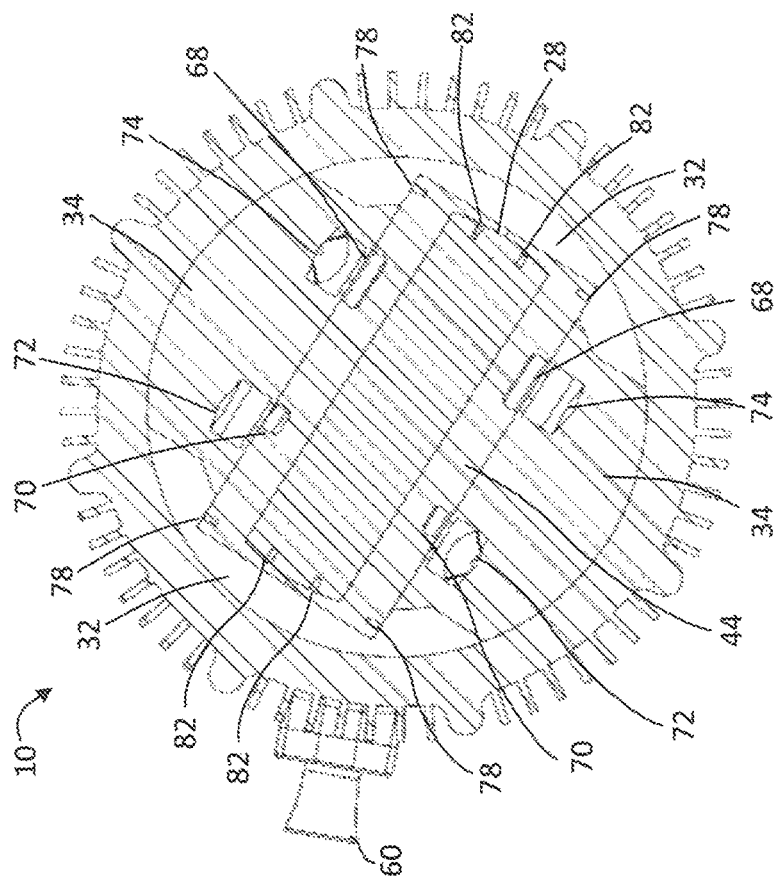
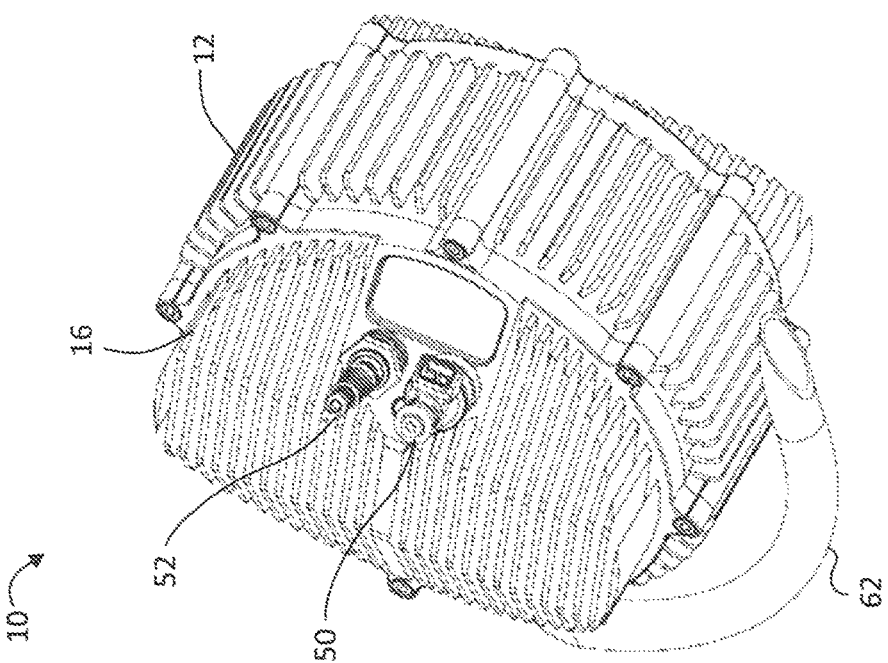
Figure 2D
Figure 2C

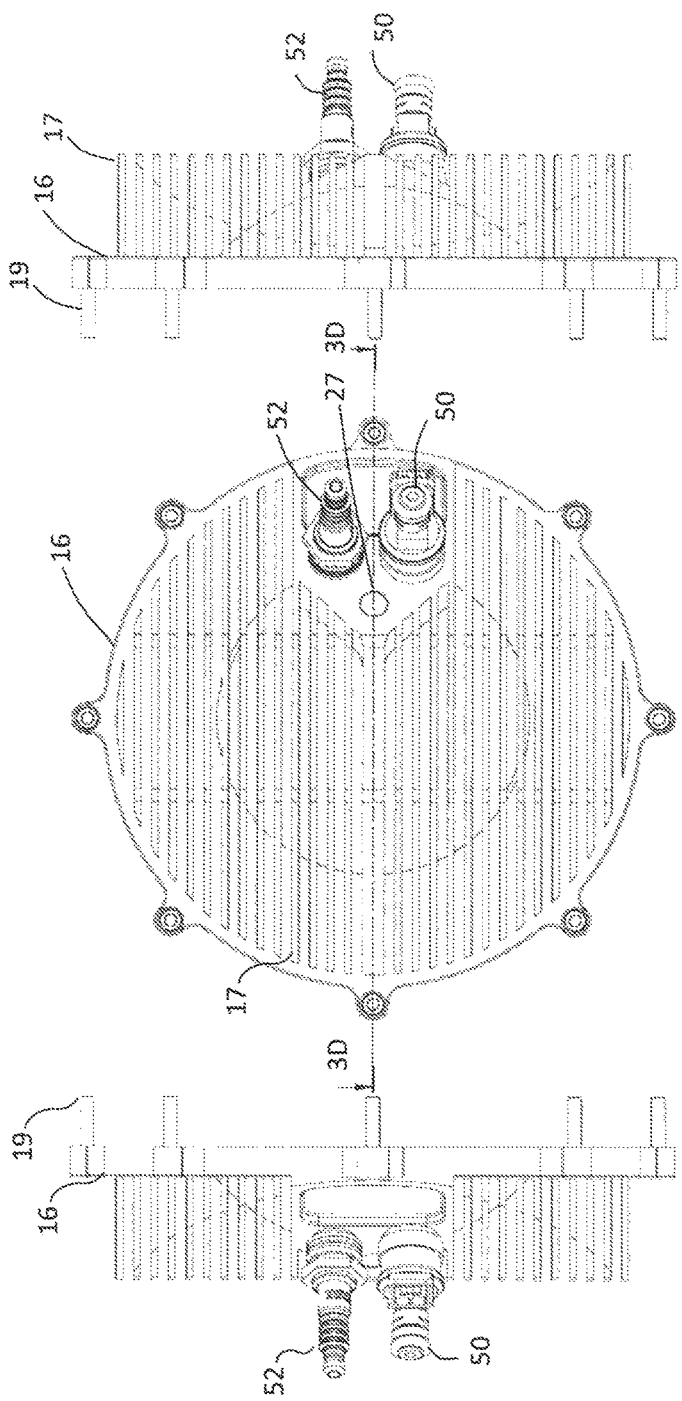

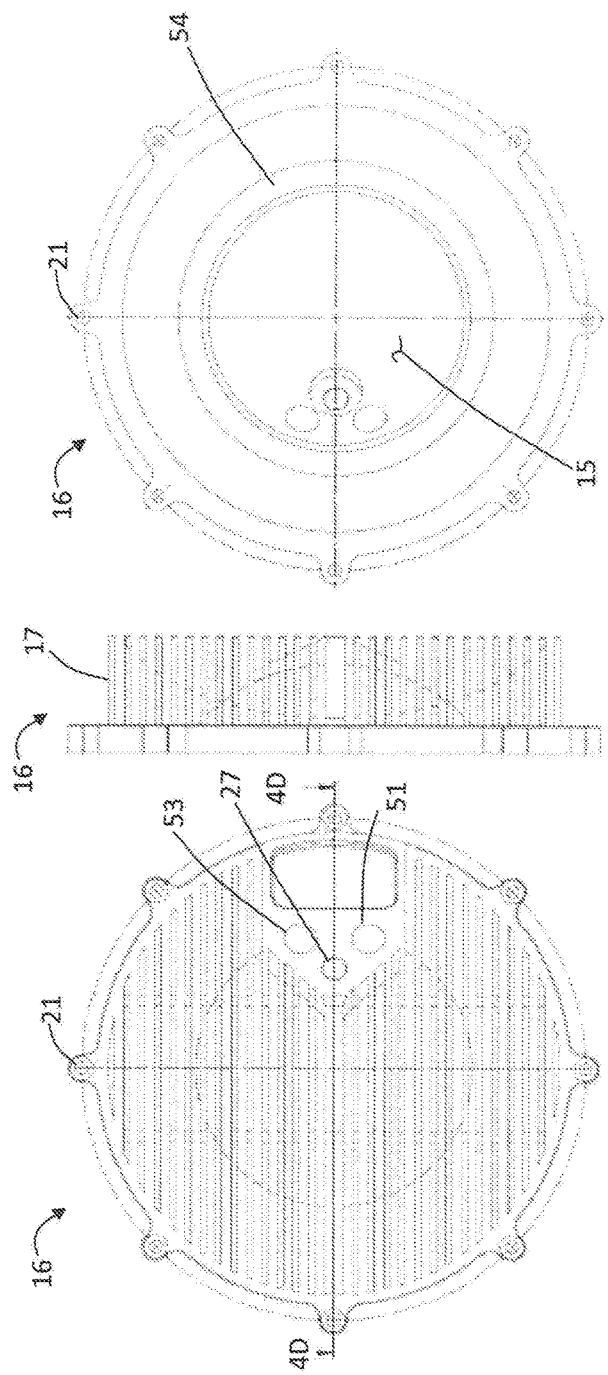
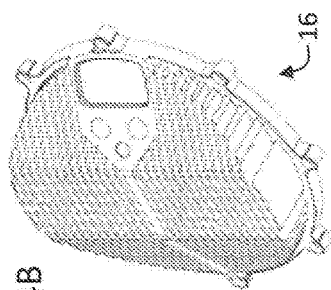
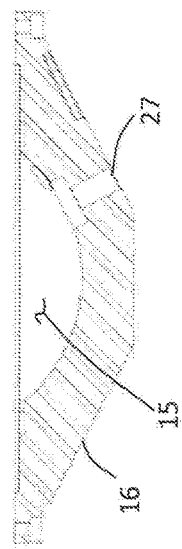
Figure 4A  Figure 4B  Figure 4C  Figure 4D  Figure 4E

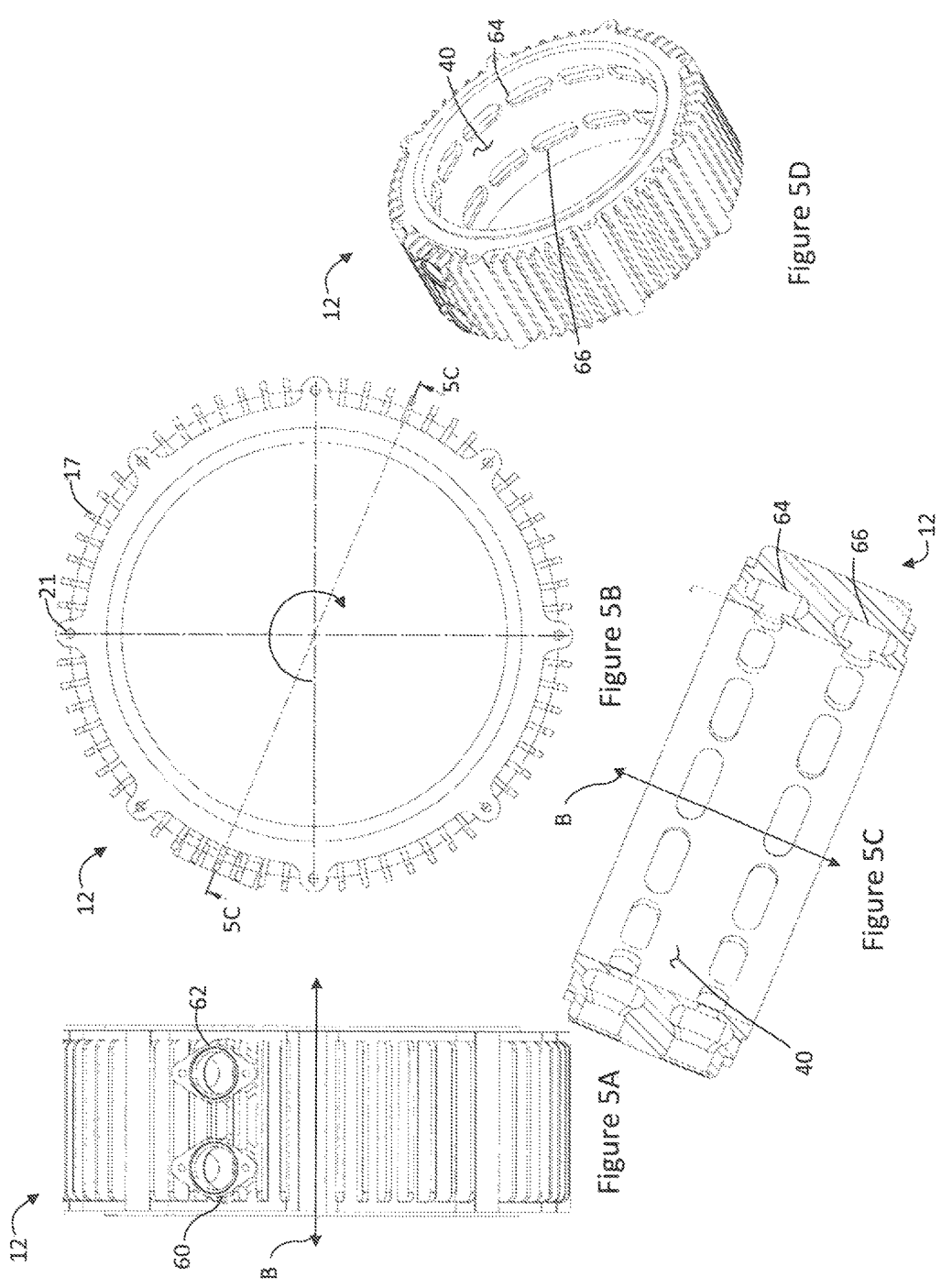

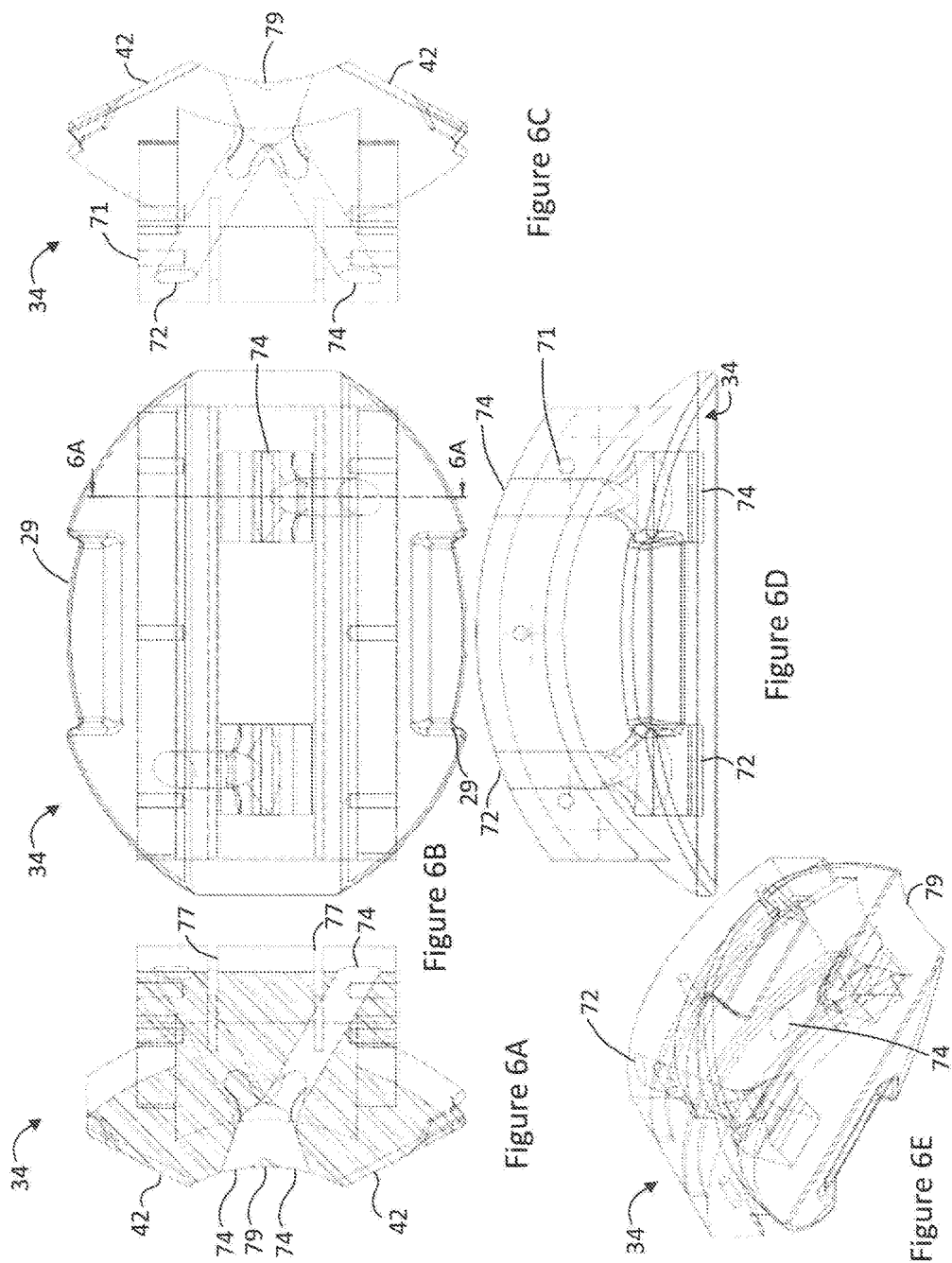

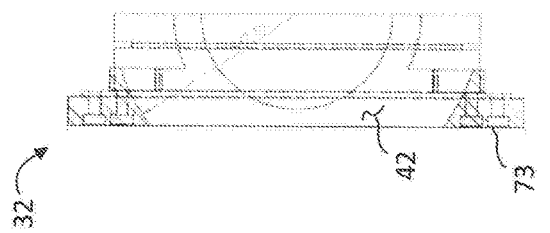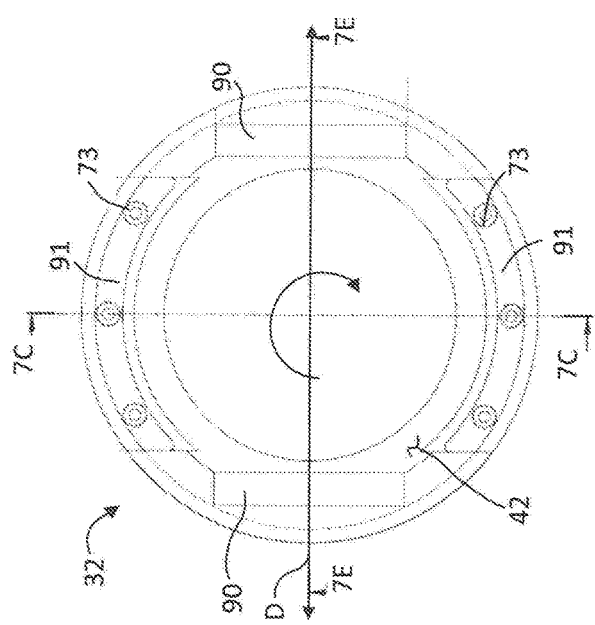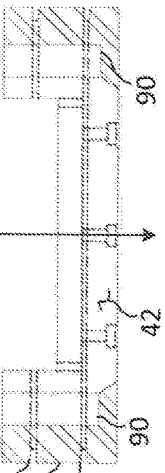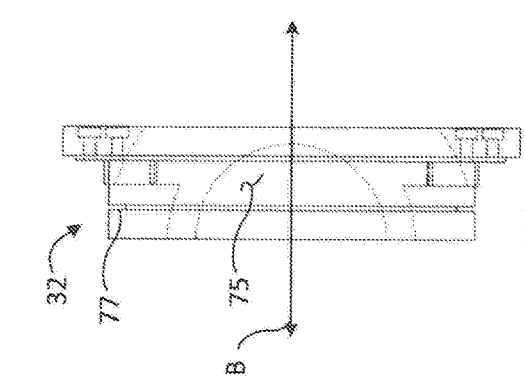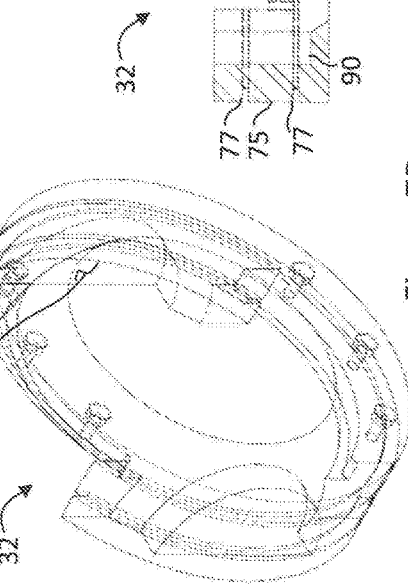

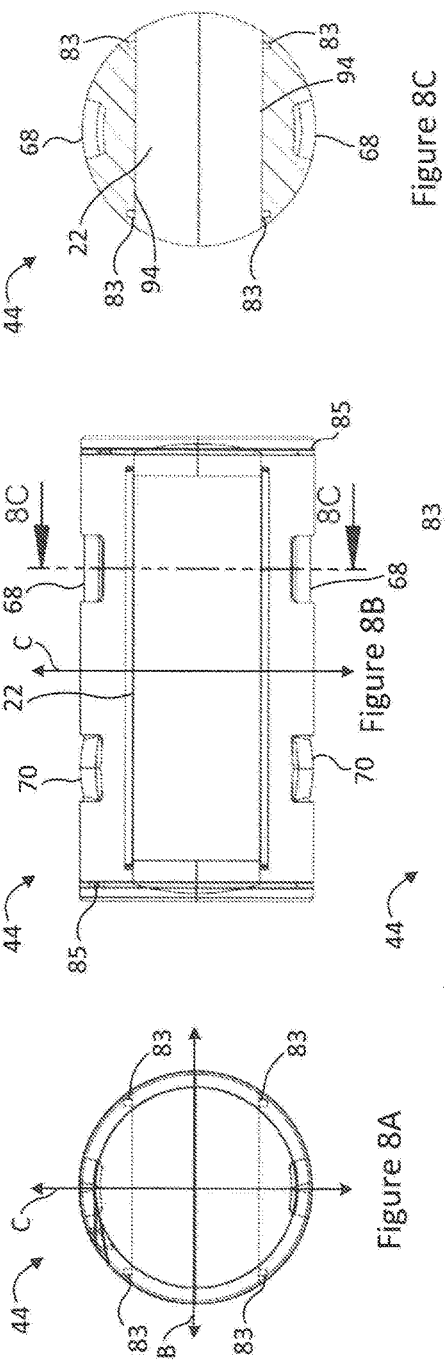

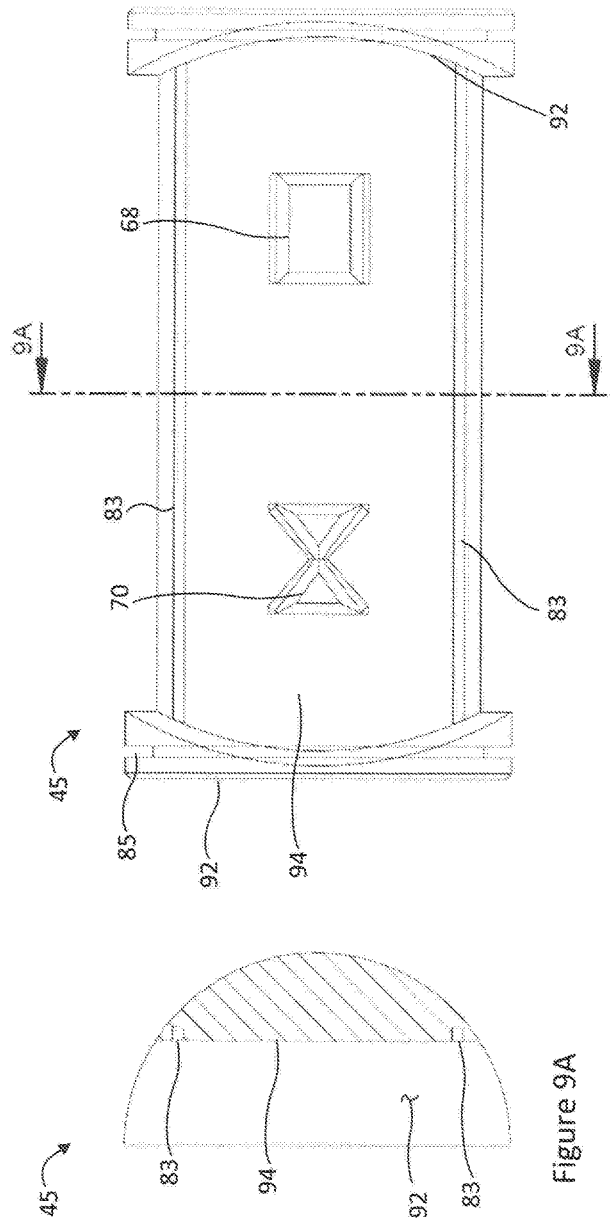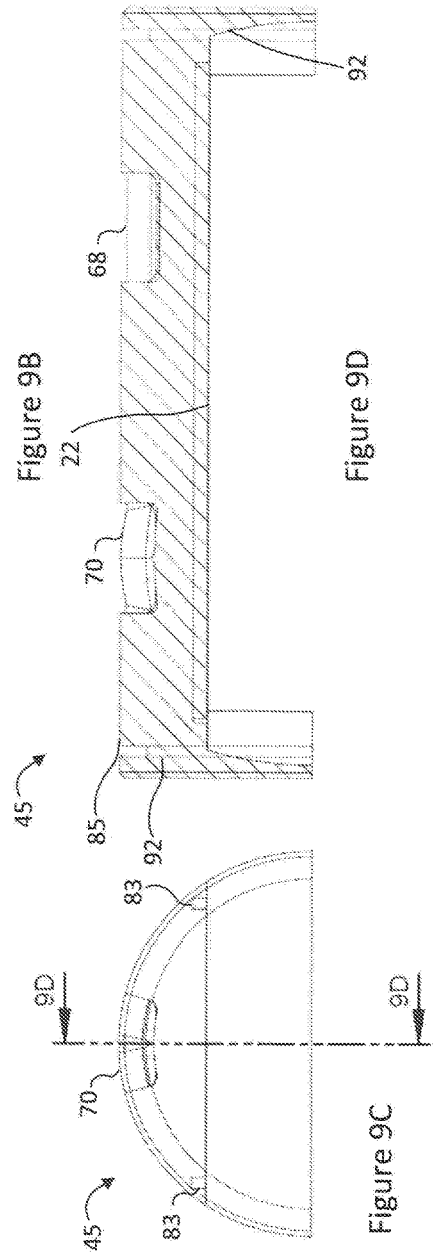

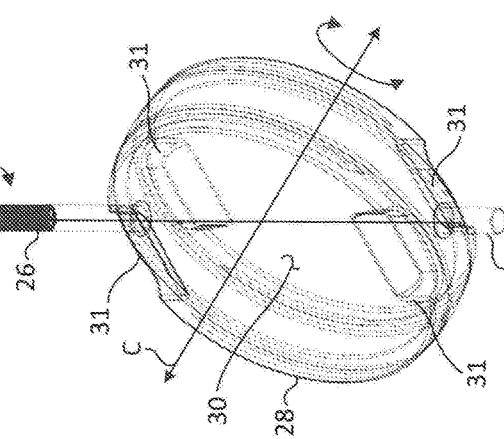
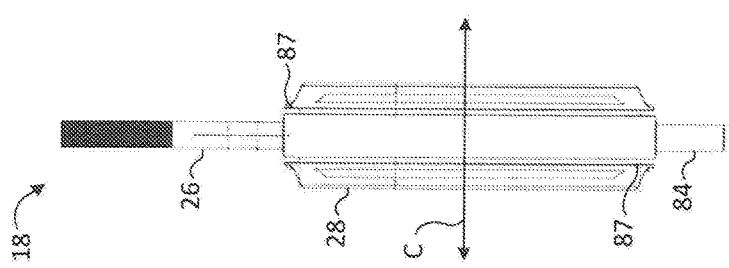
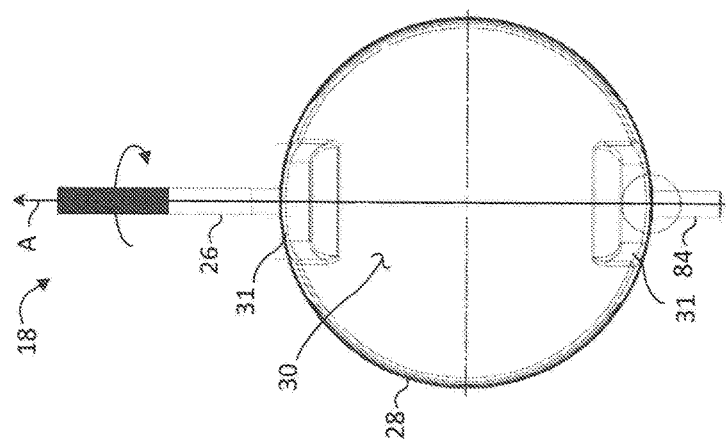
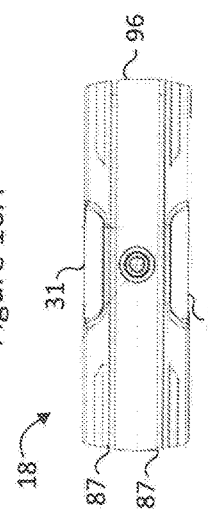

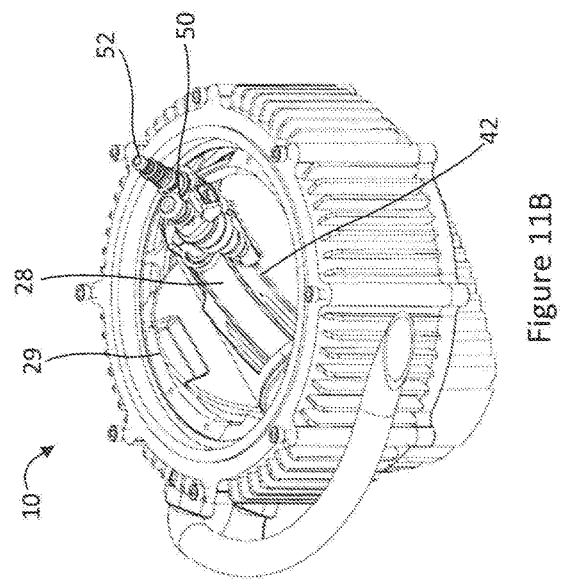
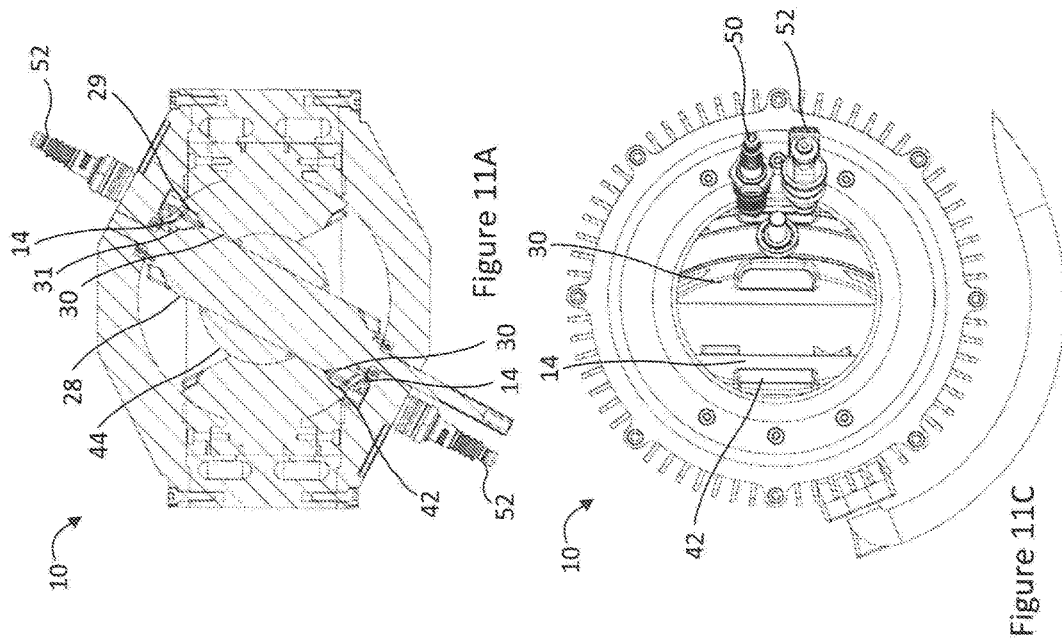
Figure 11A
Figure 11B
Figure 11C

MULTIPLE AXIS ROTARY ENGINE

TECHNICAL FIELD

The embodiments disclosed herein relate to power generation, and, in particular to rotary internal combustion engines, motors and pumps.

INTRODUCTION

An internal combustion engine is a heat engine where the combustion of a fuel occurs with an oxidizer (usually air) in a combustion chamber that is an integral part of the working fluid flow circuit. In an internal combustion engine the expansion of the high-temperature and high-pressure gases produced by combustion apply direct force to some component of the engine. The force is applied typically to pistons, turbine blades, rotor or a nozzle. This force moves the component over a distance, transforming chemical energy into useful mechanical energy.

The term internal combustion engine usually refers to an engine in which combustion is intermittent, such as four-stroke and two-stroke piston engines, along with variants, such as the six-stroke piston engine and the Wankel rotary engine.

Internal combustion engines are usually powered by energy-dense fuels such as gasoline or diesel, liquids derived from fossil fuels. While there are many stationary applications, most internal combustion engines are used in mobile applications and are the dominant power supply for vehicles such as cars, aircraft, and boats.

Typically an internal combustion engine is fed with fossil fuels like natural gas or petroleum products such as gasoline, diesel fuel or fuel oil. Engines may be particularly inefficient due to their design. Accordingly, there is a need for an improved rotary engine.

SUMMARY

According to some embodiments, there is provided a rotary engine including a housing and housing head enclosing a combustion chamber, a piston including an output shaft and a piston disk within the housing and rotatable on a piston rotation axis; a quadrant within the housing and around the piston and rotatable on a quadrant rotation axis, wherein the quadrant rotation axis is acutely angled to the piston rotation axis; and a post surrounding a segment of the piston disk, wherein the post pivots relative to the piston about a post-piston rotation axis that is normal to the face of the piston disk, wherein the post pivots relative to the quadrant about a post-quadrant pivot axis that is perpendicular to the quadrant rotation axis, and wherein the post rotates about the quadrant rotation axis relative to the housing. Combusting fuel injected into the combustion chamber expands and pushes on the piston disk to rotate the output shaft about the piston rotation axis.

According to some embodiments, there is provided a rotary engine. The rotary engine includes a housing enclosing a combustion chamber; a piston rotatably mounted about a piston rotation axis and provided within the housing, the piston including an output shaft that longitudinally bisects a piston disk, wherein the piston disk includes a circumferential surface and parallel faces on either side of the output shaft, and wherein the circumferential surface is shaped to conform with an inner surface of the housing; a quadrant rotatably mounted about a quadrant rotation axis and provided within the housing, wherein the quadrant rotation axis is acutely angled to the piston rotation axis, wherein the quadrant includes a pair of quadrant cylinders and a pair of quadrant inserts, the quadrant cylinder having an external surface that rotates over an inner surface of the housing, and the quadrant inserts having a wedge surface that defines a wall of the combustion chamber; and a cylindrically shaped post having a disk slot that pivotably receives a segment of the piston disk, wherein the post is provided on a post receiving surface within the quadrant, wherein the post pivots relative to the piston about a post-piston rotation axis that is normal to the face of the piston disk, wherein the post pivots relative to the quadrant about a post-quadrant pivot axis that is perpendicular to the quadrant rotation axis, and wherein the post rotates about the quadrant rotation axis relative to the housing. The combustion chamber is defined by surfaces of the housing, the piston disk, the quadrant insert, the quadrant cylinder, and the post. Fuel combustion causes the piston disk to rotate the output shaft about the piston rotation axis, the rotation of the piston causes the post to rotate about the quadrant rotation axis, and the quadrant to rotate in the housing. The acutely angled piston rotation axis and quadrant rotation axis and the rotation of the piston disk creates a change in the volume of the combustion chamber to facilitate a compression stroke and a power stroke.

The rotary engine may further include two combustion chambers cycling opposite each other.

The rotary engine may yields four power strokes per revolution of the piston.

The rotary engine may further include a fuel injector in a fuel injection port on the housing head for providing direct fuel injection into the combustion chamber, and a spark plug in a spark plug port on the housing head for igniting the fuel.

The combustion chamber may be fed by supercharged or electric turbocharged forced induction.

The piston rotation axis and the quadrant rotation axis may be angled to each other at between 15 and 45 degrees.

The combustion chamber may be defined by surfaces of the housing head, the piston disk, the quadrant, and the post to create the combustion chamber on opposite sides of the piston disk.

The rotary engine may further include air porting causing intake and exhaust ports to open and close allowing air in and out of the combustion chamber.

The air porting may include an intake porting conduit and an exhaust porting conduit that pass through the housing, the quadrant, and the post to allow gases to enter and exit the combustion chamber.

The post may include a post intake port for inletting fluid into the combustion chamber, and wherein the post includes a post exhaust port for outletting exhaust from the combustion chamber.

The intake porting conduit may lead from outside of the rotary engine into the combustion chamber and may include an inlet port on the housing, an intake cavity in the housing, a quadrant intake cavity in the quadrant, and the post intake port.

The exhaust porting conduit may lead from inside the combustion chamber to outside of the rotary engine and may include a post exhaust port in the housing, a quadrant exhaust cavity in the in quadrant, an exhaust cavity in the housing, and an exhaust port on the housing.

The quadrant may include cylinder sealing rings that seal the intake and exhaust porting with respect to the housing.

The post may include post sealing that seal the combustion chamber with respect to an inner surface of the quadrant. The post may include a post sealing strip on an inner surface of the post that seals with respect to the piston disk.

The piston disk may include a piston sealing ring that seals the combustion chamber with respect to an inner surface of the housing head and the quadrant.

The quadrant may include a quadrant cylinder and two quadrant inserts. The quadrant cylinder rotates on an inner surface of the housing and the quadrant inserts include a wedge surface that defines the combustion chamber.

The post may include two post segments that fit around the piston disk.

The housing and housing heads may include cooling fins for cooling the rotary engine, when in use.

The rotary engine may be banked into a four cylinder, eight cylinder, or more configuration.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 2A-2E are end, side, perspective, end section, and top section views, respectively, of the rotary engine of FIG. 1A;

FIGS. 3A-3D are side, end, opposite side, and sectional views, respectively, of a housing head assembly of the rotary engine of FIG. 1A;

FIGS. 4A-4E are end, side, interior, sectional, and perspective views, respectively, of a housing head of the rotary engine of FIG. 1A;

FIGS. 5A-5D are side, end, sectional, and perspective views, respectively, of a housing of the rotary engine of FIG. 1A;

FIGS. 6A-6E are sectional, interior, top, end, and perspective views, respectively, of a quadrant insert of the rotary engine of FIG. 1A;

FIGS. 7A-7E are side, end, side sectional, perspective, and top sectional views, respectively, of a quadrant cylinder of the rotary engine of FIG. 1A;

FIGS. 8A-8E are top, end, sectional, side, and perspective views, respectively, of a post assembly of the rotary engine of FIG. 1A;

FIGS. 9A-9D are top sectional, interior side, top, and end sectional views, respectively, of a post of the rotary engine of FIG. 1A;

FIGS. 10A-10D are front, side, perspective, and top views, respectively, of a piston of the rotary engine of FIG. 1A;

FIGS. 11A-11C are top, end, and perspective sectional views, respectively, of the rotary engine of FIG. 1A in a closed position;

DETAILED DESCRIPTION

Figure 1A:
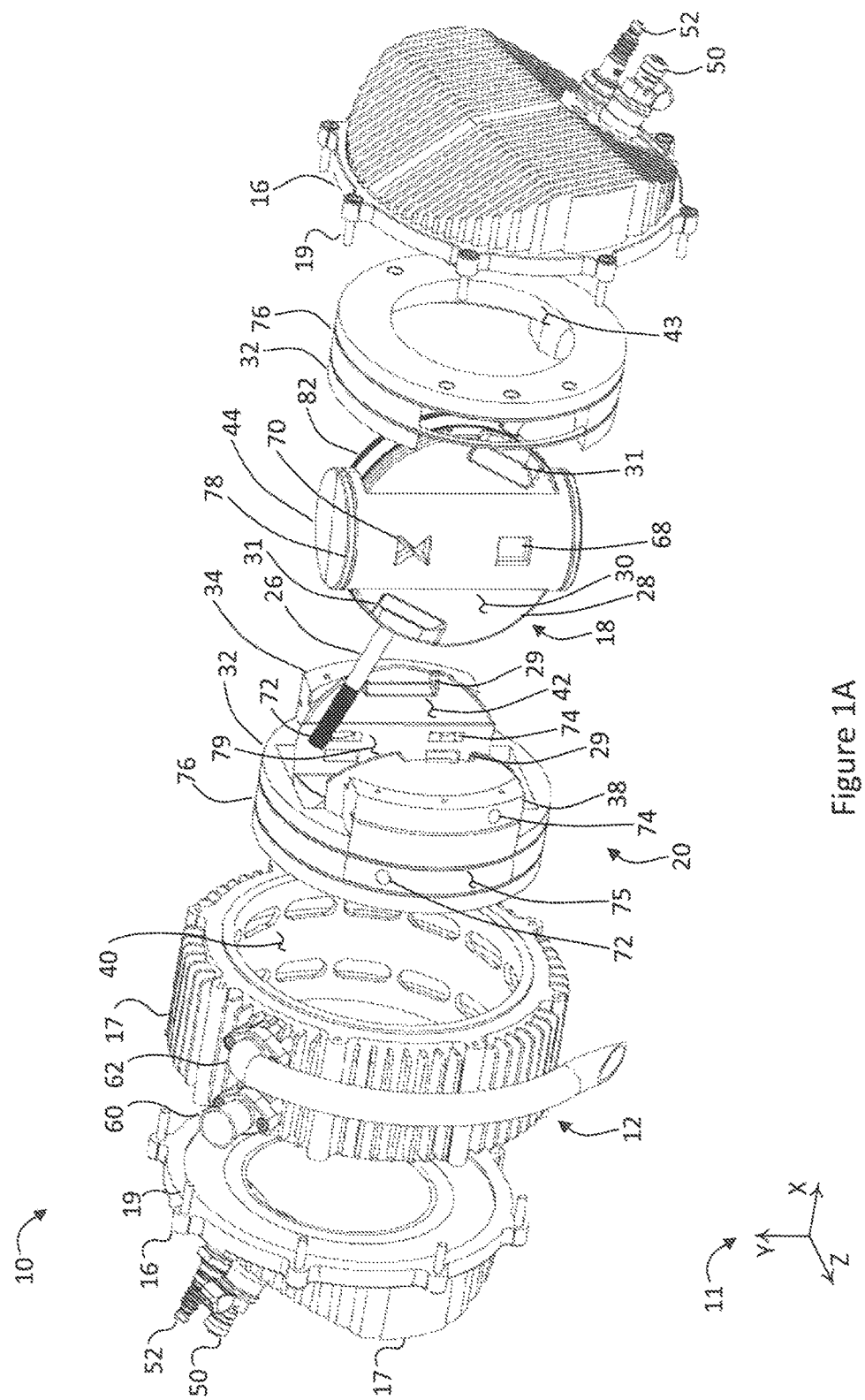
FIGS. 1A and 1B are full and detailed exploded views of a rotary engine, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Referring to FIGS. 1A to 2E, illustrated therein is a rotary engine 10, in accordance with an embodiment. The rotary engine 10 may be an internal combustion engine, a prime mover, a pump, or the like. The rotary engine 10 may be fed with fossil fuels such as natural gas or petroleum products such as gasoline, diesel fuel, or fuel oil. The fuel is ignited to provide energy to provide positive displacement to rotate the rotary engine 10 and provide mechanical energy in the form of rotary motion. In certain cases, the rotary engine 10 may be used to provide vehicular motion, machine motion, or power to other mechanical devices requiring a power source. The rotary engine 10 may be used in a vehicle to provide motive force, as a range extender for an electric vehicle connecting to a generator. The rotary engine 10 may be used in small hand tools such as gas operated trimmers and the like. The rotary engine 10 may be used where it is desirable to have a lightweight, compact, and/or efficient engine.

The rotary engine 10 may be made of any one or more of aluminum, aluminum alloys, cast iron, steel, forged steel, steel alloys, plastic, and ceramic, as appropriate and desired for the particular application.

The rotary engine 10 includes a housing 12 having two combustion chambers 14 (see FIG. 2E) enclosed by inner surfaces 15 of two housing heads 16. The housing 12 and housing heads 16 enclose the working operation of the rotary engine 10. The housing heads 16 provide access to the combustion chamber 14 as well as the internal assemblies of the rotary engine 10 for manufacture, maintenance, and repair.

The housing heads 16 may be attached via housing bolts 16 through bolt holes 21 in the housing heads 16 to the housing 12. The housing 12 and housing heads 16 may include cooling fins 17 for cooling the rotary engine 10, when in use. The housing heads 16 may also include a water cooling system (not shown) for providing water cooling to the housing 12 and the rotary engine 10.

The housing 12 may be affixed to a base or an apparatus to which it is powering. While not shown, the housing 12 may include an attachment means such as bolts and bolt holes for attaching the rotary engine 10 to the powered apparatus.

Within the housing 12, the rotary engine 10 includes three movable assemblies: a piston 18, a quadrant 20, and a post 44. The piston 18 is shown in isolation in FIGS. 10A to 10D, the components of the quadrant 20 are shown in FIGS. 6A to 7E, and the post is shown in FIGS. 8A to 9D.

Figure 1B:
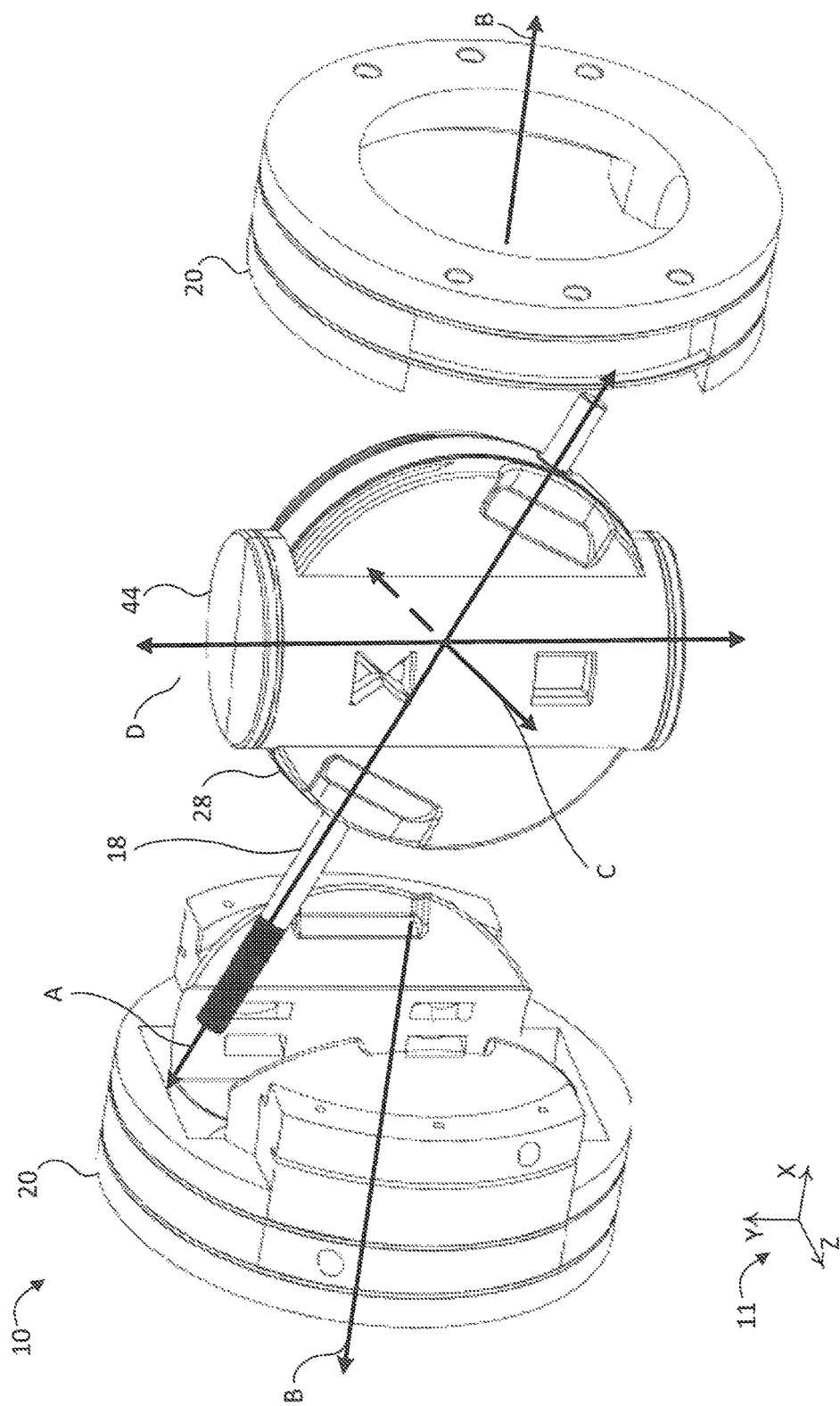
Figure 2E:
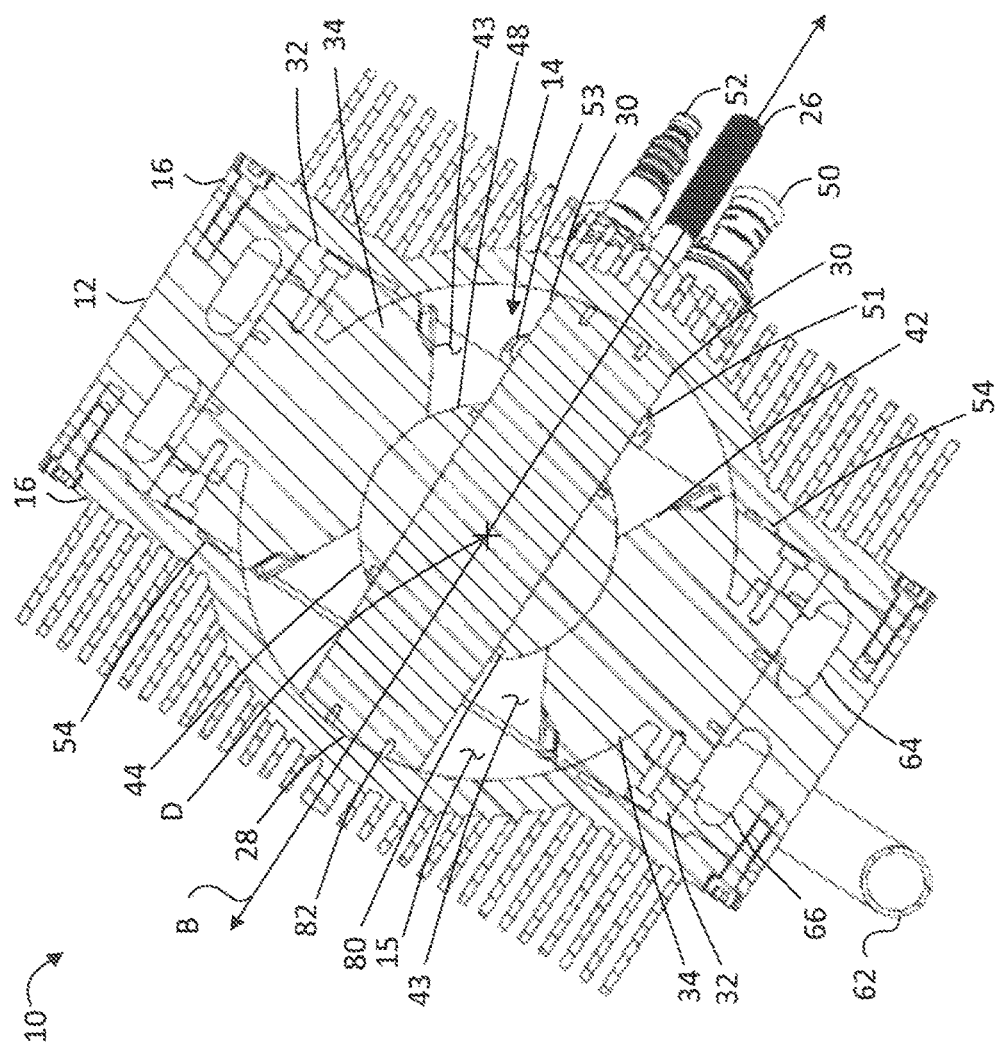

As illustrated at FIG. 1B, the separately moving assemblies (the piston 18, the quadrant 20, and the post 44) make the rotary engine 10 a multiple axis rotary engine. The piston 18 rotates on a piston rotation axis A, the quadrant 20 rotates on a quadrant rotation axis B, and the post 44 rotates with respect to the housing 12 on the quadrant rotation axis B. Further, the post 44 pivots with respect to the piston 18 on a post-piston pivot axis C and the post 44 pivots with respect to the quadrant 20 on a post-quadrant pivot axis D. Both the piston rotation axis A and the quadrant rotation axis B do not change with respect to the housing 12, while the post-piston pivot axis C and the post-quadrant pivot axis D are dependent on the rotation position of the quadrant 20 and the piston 18.

As seen from the coordinate axes 11 shown in FIGS. 1A and 1B, the piston rotation axis A rotates in the X-Y plane at an angle to both the X axis and the Y axis, while the quadrant rotation axis B rotates is in the X-Y plane along the X axis. Accordingly, the piston 18 rotates on the piston rotation axis A which is angled to the X axis and the Y axis. The quadrant 20 rotates on the quadrant rotation axis B about the X axis. The housing 12 is on an angle to the piston rotation axis A. The quadrant rotation axis B is acutely angled to the piston rotation axis A. The piston rotation axis A and the quadrant rotation axis B are angled to each other at between 5-85 degrees, particularly 15-45 degrees, and more particularly 25 degrees.

Fuel combustion causes the piston disk 28 to rotate an output shaft 26 about the piston rotation axis A, the rotation of the piston 18 causes the post 44 to pivot within the quadrant 20 and the quadrant 20 to rotate in the housing 12. The acutely angled axes A, B and the rotation of the piston disk 28 creates a change in the volume of the combustion chamber 14 to facilitate a compression stroke and a power stroke to cause the piston 18 and the quadrant 20 rotate on the axes A, B, respectively. The combustion chamber 14 is fed by forced induction on start up, and may be supercharged or electric turbocharged.

The fuel is directly injected into the combustion chamber 14 by a fuel injector 50 and ignited by an ignition device 52. The combustion of the fuel causes an increase in pressure and expansion forces to expand the combustion chamber 14 and push on the piston 18 to rotate the piston 18. The rotation of the piston 18 causes the quadrant 20 to then rotate in the housing 12 (described in further detail with respect to FIGS. 11A-15C) and the post 44 to pivot within the quadrant 20.

Referring to FIGS. 1-2E, and 10A-10D, the piston 18 includes the output shaft 26 that longitudinally bisects a piston disk 28 that together rotate about the piston rotation axis A. The output shaft 26 bisects the piston disk 28 in the housing 12. The output shaft 26 defines the piston rotation axis A.

The output shaft 26 passes through an output aperture 27 in one or, preferably, both of the housing heads 16 to provide output rotary motion about the piston rotation axis A. Both ends of the output shaft 26 may provide rotary motion at either end of the rotary engine 10. The section of the output shaft 26 that is external to the housing 12 may be mechanically attached (e.g., threaded directly, via pulleys or gears) to the apparatus or device (not shown) that the rotary engine 10 is providing the mechanical energy.

In an embodiment, the output shaft may include a conduit to provide cooling water into the piston.

The piston disk 28 is disk shaped to have parallel faces 30 on either side of the output shaft 26 that are acted upon by the combusting fuel in the combustion chamber 14. The piston disk 28 includes a circumferential surface 96 shaped to conform with an inner surface of the housing head 16. As seen at FIG. 10D, the circumferential surface 96 may be curved to conform with the inner surface 15 (seen at FIG. 2E) of the combustion chamber 14.

The faces 30 of the piston disk 28 form a surface of the combustion chamber 14. As the piston 18 rotates in the housing 12, combusting fuel injected into the combustion chamber 14 expands and pushes on the faces 30 of the piston disk 28 to rotate the output shaft 26 about the piston rotation axis A. The rotation of the piston 18 causes the quadrant 20 to rotate in the housing 12 about the quadrant rotation axis B and around the piston 18.

Referring to FIGS. 1A-2E, and FIGS. 6A-6E, illustrated therein is the quadrant 20. The quadrant 20 is a four piece construction including a pair of quadrant cylinders 32 (FIGS. 7A-7E) and a pair of quadrant inserts 34 (FIGS. 6A-6E).

The quadrant cylinders 32 and the quadrant inserts 34 are attached together, for example, by attachment mechanisms such as bolts (not shown). The quadrant inserts 34 include attachment apertures 71 for bolts that correspond to quadrant cylinder 32 attachment apertures 73 on an insert surface 91 for attaching the quadrant inserts 34 with the quadrant cylinder 32. In an alternative embodiment, the quadrant cylinders 32 and the quadrant inserts 34 are formed of a single piece.

The quadrant cylinder 32 and the quadrant inserts 34 include an external surface 75 that rotates over an inner surface 40 of the housing 12. The external surface 75 may include bearings (not shown) to provide gliding motion having low friction between the external surface 75 of the quadrant 20 and the inner surface 40 of the housing 12.

The quadrant cylinder 32 includes an inner surface 43 that defines a wall of the combustion chamber 14 that conforms with the piston disk 28 and mates with the housing head 16. The circumferential surface 96 of the piston disk 28 rides on the inner surface 43 in the combustion chamber 14.

The quadrant inserts 34 include a wedge surface 42 that defines the combustion chamber 14. The wedge surface 42 is angled to correspond to the angle of rotation of the piston disk 28. The wedge surface 42 may include a cutout 29 that provides an initial cavity for the combustion chamber 14. The piston disk 28 may also have a similar corresponding disk cutout 31 on each side and end of the piston disk 28. Where the piston disk 28 is a full extension of rotation, the piston disk 28 is generally parallel to and may be close to or in contact with the wedge surface 42.

The cutout 29 chamber is aligned with the spark plug 60 and fuel injector 62.

Referring to FIGS. 1A-2E, and 8A-9D, illustrated there in is the post 44. The post 44 includes a disk slot 22 for receiving a segment of the piston disk 28. The post 44 is positioned within the quadrant 20 and rides on a post receiving surface 90 within the quadrant 20. The post 44 is cylindrically shaped and surrounds a segment of the piston disk 28. The post 44 also acts to separate opposite combustion chambers 14 from each other. The post 44 may fit around the piston disk 28 in two post segments 45. The piston 18 and post 44 both fit into the quadrant 20.

The post 44 rotates about the quadrant rotation axis B with respect to the housing 12 and within the quadrant 20 as the quadrant 20 rotates. With respect to the quadrant 20, the post 44 pivots about the post-quadrant pivot axis D, which passes through the longitudinal center of the post 44. The post 44 also pivots on the face of the piston disk 28 about the post-piston pivot axis C, which is normal to the face of the piston disk 28. More particularly, the post 44 oscillates back and forth about the post-piston pivot axis C and the post-quadrant pivot axis D, as the piston 18 and quadrant 20 rotate.

The post-piston pivot axis C is relative to the piston 18 in that the post-piston pivot axis C is normal to the face 30 of the piston disk 28. Accordingly, the post-piston pivot axis C is dependent on the position of the rotating piston disk 28 and thus the piston rotation axis A.

The post-quadrant pivot axis D is relative to the quadrant in that the post-quadrant pivot axis D is perpendicular to the quadrant rotation axis B. Accordingly, the post-quadrant pivot axis D is dependent on the position of the rotating quadrant 20 and thus the quadrant rotation axis B. Depending on the rotation of the post 44, a larger or smaller surface 48 of the post 44 defines the combustion chamber 14.

The piston 18 rotates in one continuous direction and the quadrant 20 rotates in one continuous direction, while the post 44 rotates in one continuous direction as well as oscillates back and forth.

Each combustion chamber 14 is defined by surfaces of the housing head 16 (surface 15), the piston disk 28 (surface 30), the quadrant insert 34 (surface 42), the quadrant cylinder 32 (surface 43) and the post 44 (surface 48). This creates larger and smaller chambers on opposite sides of the piston disk 28, which creates the combustion chambers 14. The housing head 16 surface 15 is spherical to close off the combustion chamber 14. The combustion chamber 14 rotates itself within the housing 12.

The rotary engine 10 in an illustrated embodiment is a two cycle design with the twin combustion chambers 14 cycling opposite each other and yielding four power strokes (two per side) per revolution of the piston 18. While the rotary engine 10 may be of a single combustion chamber 14 design, the two cycle design may be particularly efficient, as the first combustion chamber 14 cycles opposite to that of the second combustion chamber 14, thereby providing continuous power output.

Turning to FIGS. 3A-5D, illustrated therein is the housing head 16 and the housing 12. The housing heads 16 each have the fuel injector 50 in a fuel injection port 51 for providing direct fuel injection into the combustion chamber 14. The housing heads 16 include the ignition device 52 such as a spark plug in a spark plug port 53 for igniting the fuel. The ignition device 52 and fuel injector 50 are positioned on the housing head 16 adjacent the output shaft 26 proximal to the smaller side of the combustion chamber 14.

The housing 12 also includes a sealing ring 54 between the housing head 16 and the quadrant 20 sealing the combustion chamber 14. The housing 12 may also include a head gasket (not shown) between the housing 12 and the housing heads 16. The housing head 16 also includes a support bearing 58 for rotatably supporting the output shaft 26 in the output aperture 27.

The rotary engine 10 includes fluid porting including intake and exhaust ports that open and close allowing air in and out of the combustion chamber 14. In a particular embodiment, the rotary engine 10 includes intake 60 and exhaust 62 porting conduits that pass through the housing 12, the quadrant 20, and the post 44 to the combustion chamber 14. The rotary engine 10 may include a plurality of intake 60 and exhaust 62 ports. The intake port 60 and the exhaust port 62 are channeled through the quadrant insert 32 to the housing 12. The housing 12 is stationery and has two circumferential cavities: an intake cavity 64 and an exhaust cavity 66 which allow the gases to enter and exit the combustion chamber 14. The intake port 60 is larger than the exhaust port 62. The exhaust port 62 opens and closes at a slower rate than the intake port 60.

In particular, the post 44 includes a post intake port 68 for inletting fluid into the combustion chamber 14. The post 44 also includes a post exhaust port 70 for outletting exhaust from the combustion chamber 14. The post exhaust port 70 may be smaller in size than the post intake port 68. The post exhaust port 70 may have dual-triangular shape to provide an exhaust opening when the post 44 has rotated to an exhaust position. As the post 44 pivots, air is received in the inlet port 60 on the housing 12 and passes to an intake cavity 64 in the housing 12. The intake cavity 64 fluidly communicates with a quadrant intake cavity 72 in the quadrant insert 32 and through to the post intake port 68 on the post 44 that leads into the combustion chamber 14.

The post exhaust port 70 communicates with a quadrant exhaust cavity 74 in the in quadrant insert 34 and then passes to the exhaust cavity 66 in the housing 12 circumferentially surrounding the quadrant 20 and through to the exhaust port 62 on the housing 12. The post intake port 68 and post exhaust port 70 may include sealing for sealably passing intake and exhaust, respectively.

The rotary engine 10 also has bearings and seals to separate the combustion chambers 14 and to keep the moving parts moving smoothly. The rotary engine 10 may also include lubrication for providing low friction movement of the components. Turning now to FIGS. 6A-7E, illustrated therein is the quadrant inserts 34 and the quadrant cylinder 32. The quadrant 40 has the external surface 75 with cylinder sealing rings 76 in grooves 77 that seal the intake and exhaust porting with respect to the housing 12.

The quadrant cylinder 32 includes the post receiving surface 90 for mating with an outer surface 92 (FIG. 8D) of the post 44.

Turning now to FIGS. 8A-9D, illustrated therein is the post 44 which is formed of the two post segments 45. The post 44 has post sealing rings 78 in grooves 85 that seal the combustion chamber 14 with respect to an inner surface 79 of the quadrant insert 34. The post segment 45 includes a disk contact surface 94 in the disk slot 22 for contacting the face 30 of the piston disk 28. The post 44 also has a post sealing strip 80 in groove 83 on the disk contact surface 94 of the post 44 that seals with respect to the piston disk 28.

Turning now to FIGS. 10A to 10D, illustrated therein is the piston 18. The piston disk 28 has a piston sealing ring 82 in grooves 87 on the circumferential surface 96 that seals the combustion chamber 14 with respect to the inner surface 15 of the housing head 16 and the inner surface 43 of the quadrant cylinder 32. The piston 18 has a pivot base 84 that pivots about the piston rotation axis A. The post 44 rotates on post-piston pivot axis C normal to the face 30 of the piston disk 28. The piston disk 28 has two cutouts 31 on each face 30 of the piston disk 28 for providing an area for the combustion chamber 14, when fully closed.

Turning now to FIGS. 11A to 15B illustrated therein is the rotary engine 10 rotating through a combustion cycle from a closed to an open position, in accordance with an embodiment.

FIGS. 11A to 11C illustrate the rotary engine 10 with the combustion chamber 14 in a closed position to end the compression stroke and the beginning of the power stroke. The face 30 of the piston disk 28 is close to or in contact with the wedge surface 42 and the cutout 31 of the piston disk 28 and the cutout 29 of the wedge surface 42 provide space for the combustion chamber 14. Fuel is injected through the fuel injector 50 into the combustion chamber 14, and the fuel is ignited by the igniting device 52 to cause an increase in pressure and the expansion of the combustion chamber 14. The post intake port 68 and the post exhaust port 70 are closed.

Figure 12B:
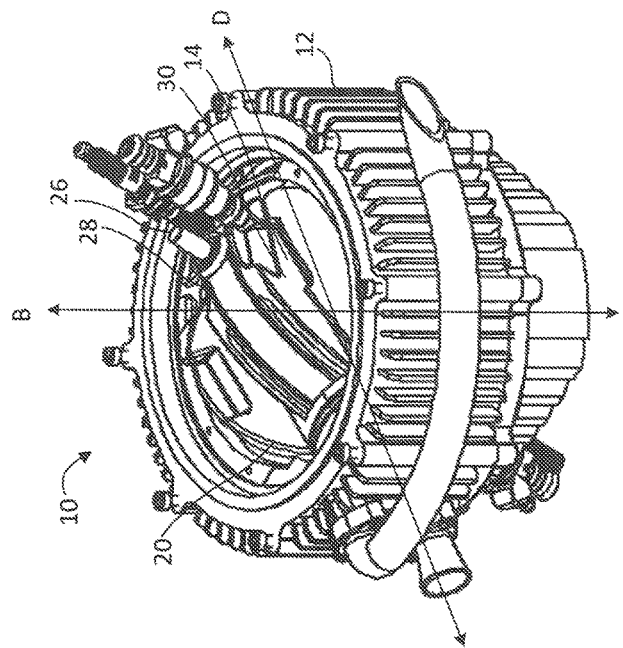
FIGS. 12A-12C are top, end, and perspective sectional views, respectively, of the rotary engine of FIG. 1A in a slightly open position.
Figure 12A:
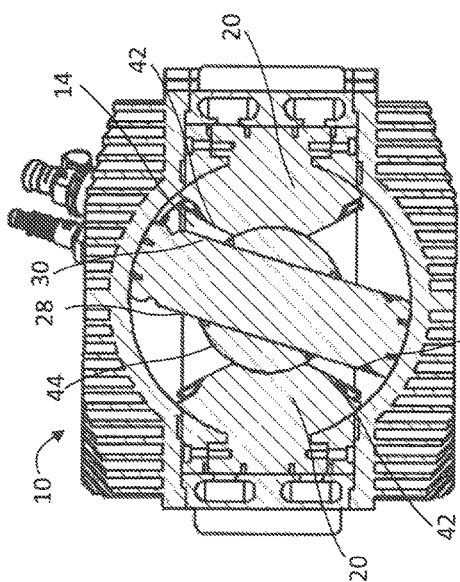
Figure 12C:
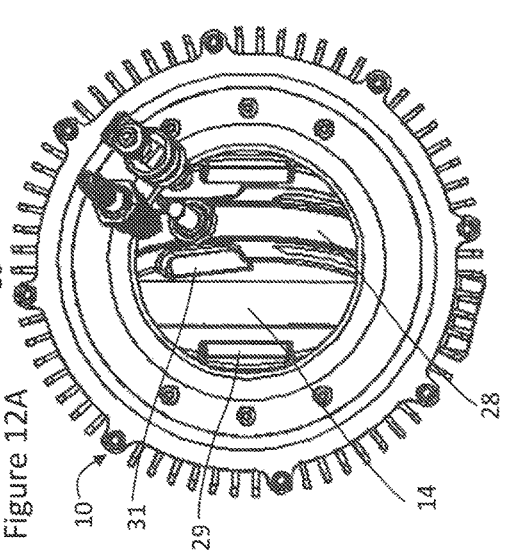

FIGS. 12A to 12C illustrate the rotary engine 10 with the combustion chamber 14 in a slightly open position at the beginning of the power stroke. Note that the section view of the FIGS. 12A to 12C has rotated with the piston disk 28, in order to illustrate the change in size of the combustion chamber 14. In the slightly open position, the ignited fuel has forced the face 30 of the piston disk 28 to rotate (about the piston rotation axis A), causing the size of the combustion chamber 14 to expand. The rotation of the piston disk 28 causes the output shaft 26 to rotate (about the piston rotation axis A) to provide output energy. The piston disk 28 also forces the post 44 to pivot (about post-piston pivot axis C) on the face 30 of the piston disk 28 and pivot (about post-quadrant pivot axis D) within the quadrant 20 and rotate (about the quadrant rotation axis B) within the housing 12. As seen in FIG. 12A, the face 30 of the piston disk 28 has pivoted away from the wedge surface 42. Further, the piston disk 28 has forced the quadrant 20 to rotate about the quadrant rotation axis B within the housing 12.

Figure 13B:
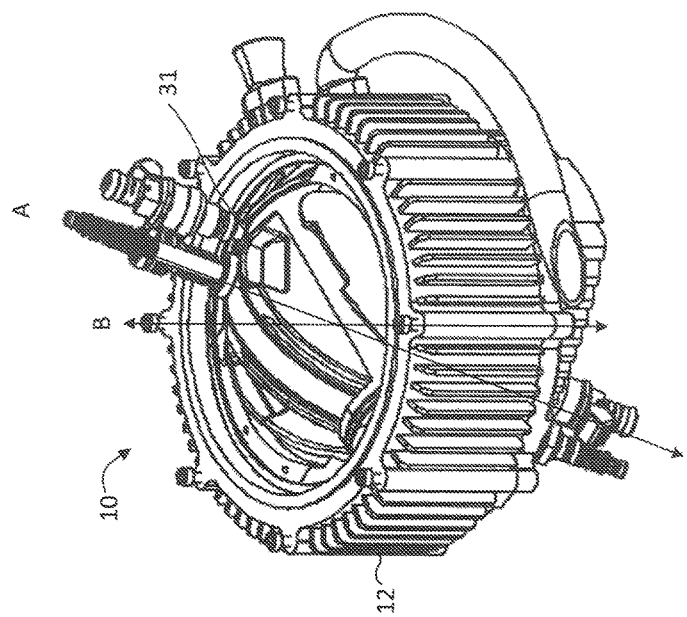
FIGS. 13A-13C are top, end, and perspective sectional views, respectively, of the rotary engine of FIG. 1A in a halfway open position.
Figure 13A:
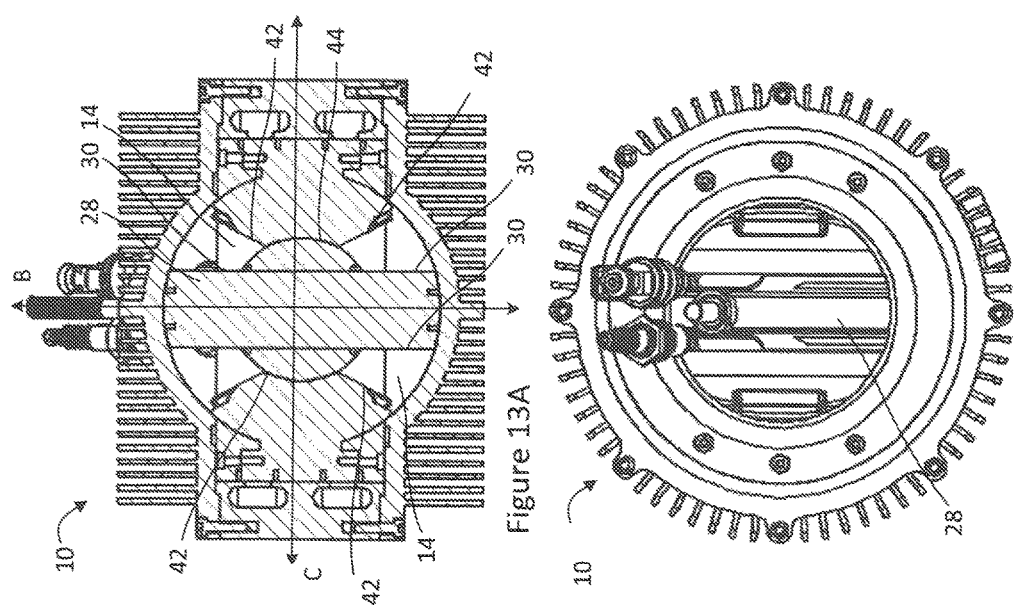
Figure 13C:
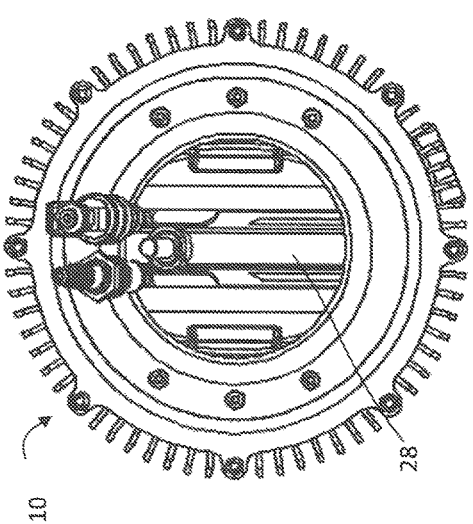

FIGS. 13A to 13C illustrate the rotary engine 10 with the combustion chamber 14 in a halfway open position where the power stroke is ending and the compression stroke begins. Again, the views of FIGS. 13A to 13C have rotated with the piston disk 28, in order to illustrate the expansion of the combustion chamber 14. In the halfway open position, the piston disk 28 has rotated 90 degrees (about the piston rotation axis A) and the faces 30 on either side of the piston disk 28 are equally separated from the wedge surfaces 42. The post 44 has pivoted further (about the post-quadrant pivot axis D) in the quadrant 20 and further (about the post-piston pivot axis C) on the face of the piston disk 28 and also with respect to the housing 12 (about the quadrant rotation axis B). The quadrant 20 has rotated 90 degrees (about the quadrant rotation axis B) in the housing 12 from the closed position.

Figure 14B:
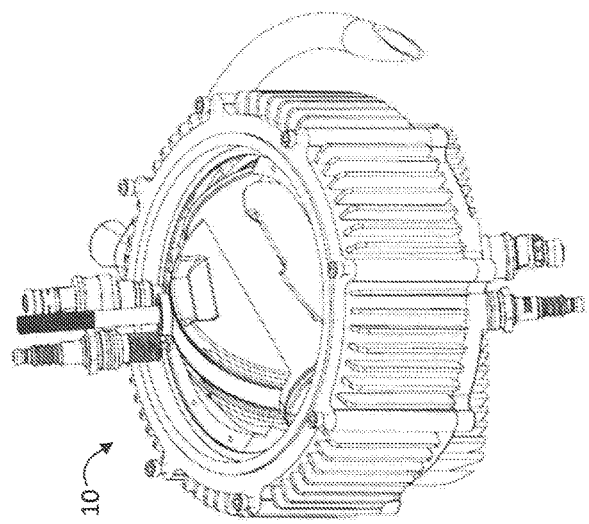
FIGS. 14A-14C are top, end, and perspective sectional views, respectively, of the rotary engine of FIG. 1A in a mostly open position.
Figure 14A:
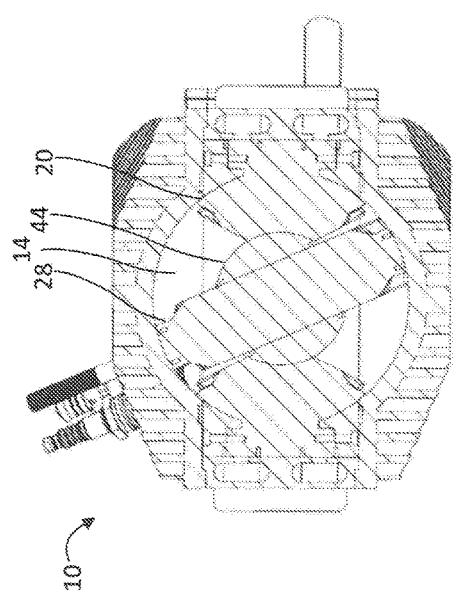
Figure 14C:
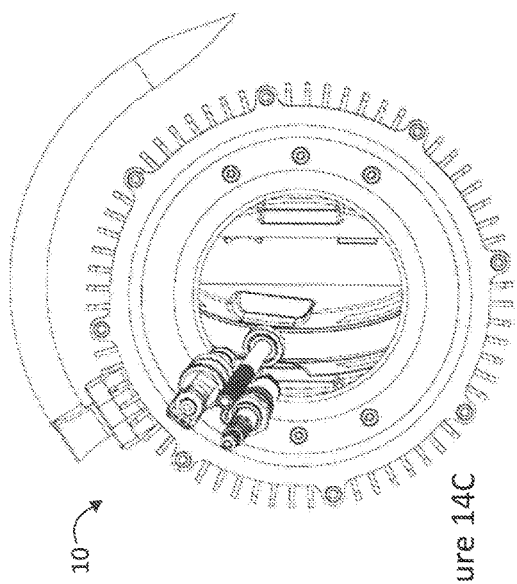

FIGS. 14A to 14C illustrate the rotary engine 10 with the combustion chamber 14 in a mostly open position in the compression stroke, with the views also rotating with the piston disk 28. In the mostly open position, the piston disk 28 has rotated further, the post 44 has rotated and pivoted further, and the quadrant 20 has rotated further, about their respective axes (A, C & D & B, and B, respectively) from the halfway open position.

Figure 15A:
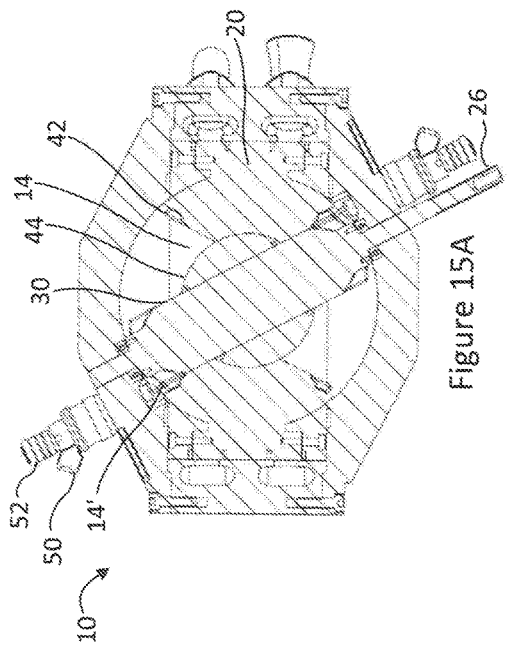
FIGS. 15A-15C are top, end, and perspective sectional views, respectively, of the rotary engine of FIG. 1A in a fully open position.
Figure 15B:
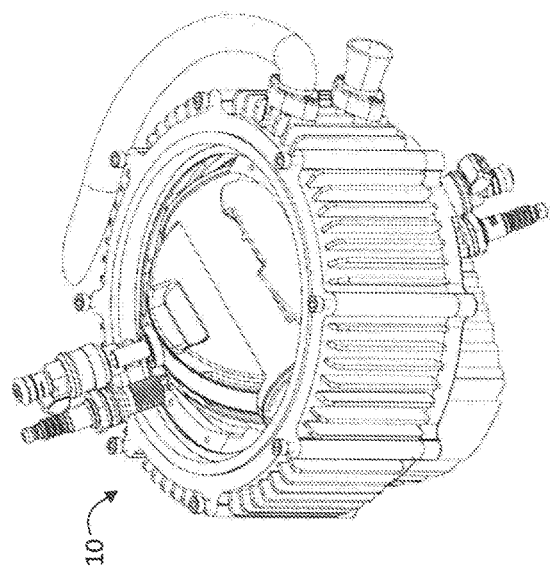
Figure 15C:
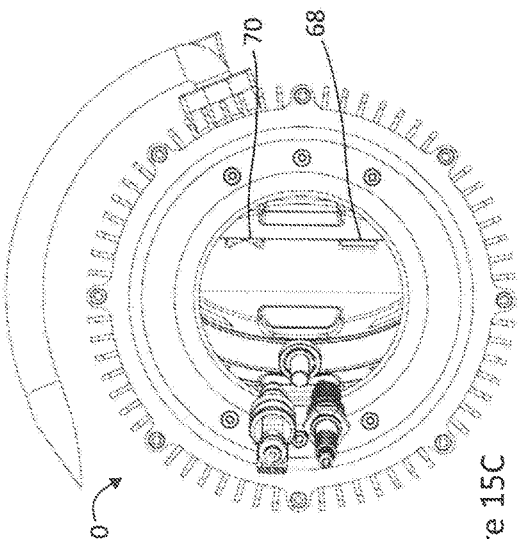

FIGS. 15A to 15C illustrate the rotary engine 10 with the combustion chamber 14 in a fully open position at the end of the power stroke and the beginning of the compression stroke, with the views also rotating with the piston disk 28. In the fully open position, the piston disk 28 has rotated 180 degrees and such that the face 30 of the piston disk 28 is furthest from the wedge surface 42. The post 44 has also pivoted further such that the disk slot 22 is parallel with the wedge surface 42. The quadrant 20 has rotated further, 180 degrees, from the closed position (FIGS. 11A-11C).

In the fully open position the combustion chamber 14 is scavenged and the post intake port 68 opens to provide intake air and the post exhaust port 70 opens to exhaust the combusted fuel. The post intake port 68 and the post exhaust port 70 are located on the face of the post 44 and pass into the quadrant 20 then through to the housing 12 and out the intake port 60 and exhaust port 62, respectively.

After being driven to the fully open position, the second cycle begins and the opposite face 30 of the piston disk 28 becomes a surface of the new combustion chamber 14', with the piston disk 28 rotated and in the closed position with the fuel injector 50 and ignition device 52 located at the new combustion chamber 14'. The combustion cycle then begins again and the post 44 will begin to pivot back, the piston disk 28 will continue to rotate around the output shaft 26, and the quadrant 20 will continue to rotate in the housing 12.

In a further embodiment, the rotary engine 10 may be banked into a four engine, eight engine, or more configuration to provide increased power and efficiency.

When the rotary engine 10 operates as a pump, rotary mechanical motion is provided to the rotary engine 10 and fluid is pumped through the engine as the combustion chamber 14 expands and contracts.

While the above description provides examples of one or more apparatus, methods, or systems, it will be appreciated that other apparatus, methods, or systems may be within the scope of the claims as interpreted by one of skill in the art.

The invention claimed is:

1. A rotary engine comprising:
a housing enclosing a combustion chamber;
a piston rotatably mounted about a piston rotation axis and provided within the housing, the piston including an output shaft that longitudinally bisects a piston disk, wherein the piston disk includes a circumferential surface and parallel faces on either side of the output shaft, and wherein the circumferential surface is shaped to conform with an inner surface of the housing;
a quadrant rotatably mounted about a quadrant rotation axis and provided within the housing, wherein the quadrant rotation axis is acutely angled to the piston rotation axis, wherein the quadrant includes a pair of quadrant cylinders and a pair of quadrant inserts, the quadrant cylinder having an external surface that rotates over an inner surface of the housing, and the quadrant inserts having a wedge surface that defines a wall of the combustion chamber;
a cylindrically shaped post having a disk slot that pivotably receives a segment of the piston disk, wherein the post is provided on a post receiving surface within the quadrant, wherein the post pivots relative to the piston about a post-piston rotation axis that is normal to the face of the piston disk, wherein the post pivots relative to the quadrant about a post-quadrant pivot axis that is perpendicular to the quadrant rotation axis, and wherein the post rotates about the quadrant rotation axis relative to the housing; and
air porting configured to allow intake and output ports to open and close as the post pivots, allowing air in and out of the combustion chamber;
wherein the combustion chamber is defined by surfaces of the housing, the piston disk, the quadrant insert, the quadrant cylinder, and the post;
wherein fuel combustion causes the piston disk to rotate the output shaft about the piston rotation axis, the rotation of the piston causes the post to rotate about the quadrant rotation axis, and the quadrant to rotate in the housing; and
wherein the acutely angled piston rotation axis and quadrant rotation axis and the rotation of the piston disk creates a change in the volume of the combustion chamber to facilitate a compression stroke and a power stroke.

2. A rotary engine comprising:
a housing and housing head enclosing a combustion chamber;
a piston including an output shaft and a piston disk within the housing and rotatable on a piston rotation axis;
a quadrant within the housing and around the piston and rotatable on a quadrant rotation axis, wherein the quadrant rotation axis is acutely angled to the piston rotation axis;

a post surrounding a segment of the piston disk, wherein the post pivots relative to the piston about a post-piston rotation axis that is normal to the face of the piston disk, wherein the post pivots relative to the quadrant about a post-quadrant pivot axis that is perpendicular to the quadrant rotation axis, and wherein the post rotates about the quadrant rotation axis relative to the housing; and air porting configured to allow intake and output ports to open and close as the post pivots, allowing air in and out of the combustion chamber;

wherein combusting fuel injected into the combustion chamber expands and pushes on the piston disk to rotate the output shaft about the piston rotation axis.

3. The rotary engine of claim 2 further comprising a second combustion chamber that cycles opposite to the combustion chamber.

4. The rotary engine of claim 3, wherein the rotary engine yields four power strokes per revolution of the piston.

5. The rotary engine of claim 2 further comprising:
a fuel injector in a fuel injection port on the housing head for providing direct fuel injection into the combustion chamber; and
a spark plug in a spark plug port on the housing head for igniting the fuel.

6. The rotary engine of claim 2, wherein the combustion chamber is fed by forcing supercharged or electric turbocharged air into the intake port.

7. The rotary engine of claim 2, wherein the piston rotation axis and the quadrant rotation axis are angled to each other at between 15 and 45 degrees.

8. The rotary engine of claim 2, wherein the combustion chamber is defined by surfaces of the housing head, the piston disk, the quadrant, and the post to create the combustion chamber on opposite sides of the piston disk.

9. The rotary engine of claim 2, wherein the air porting includes an intake porting conduit and an exhaust porting conduit that pass through the housing, the quadrant, and the post to allow gases to enter and exit the combustion chamber.

10. The rotary engine of claim 9, wherein the post includes a post intake port for inletting fluid into the combustion chamber, and wherein the post includes a post exhaust port for outletting exhaust from the combustion chamber.

11. The rotary engine of claim 10, wherein the intake porting conduit leads from outside of the rotary engine into the combustion chamber and includes an inlet port on the housing, an intake cavity in the housing, a quadrant intake cavity in the quadrant, and the post intake port.

12. The rotary engine of claim 11, wherein the exhaust porting conduit leads from inside the combustion chamber to outside of the rotary engine and includes a post exhaust port in the housing, a quadrant exhaust cavity in the quadrant, an exhaust cavity in the housing, and an exhaust port on the housing.

13. The rotary engine of claim 2, wherein the quadrant includes cylinder sealing rings that seal the intake and exhaust porting with respect to the housing.

14. The rotary engine of claim 2, wherein the post includes post sealing that seal the combustion chamber with respect to an inner surface of the quadrant, and wherein the post includes a post sealing strip on an inner surface of the post that seals with respect to the piston disk.

15. The rotary engine of claim 2, wherein the piston disk includes a piston sealing ring that seals the combustion chamber with respect to an inner surface of the housing head and the quadrant.

16. The rotary engine of claim 2, wherein the quadrant includes a quadrant cylinder and two quadrant inserts, and wherein the quadrant cylinder rotates on an inner surface of the housing and the quadrant inserts include a wedge surface that defines the combustion chamber.

17. The rotary engine of claim 2, wherein the post includes two post segments that fit around the piston disk.

18. The rotary engine of claim 2, wherein the housing and housing heads include cooling fins for cooling the rotary engine, when in use.

\* \* \* \* \*